(No Model.)
G. SEEBICK.
COASTING SLED.
No. 505,993. Patented Oct. 3, 1893.
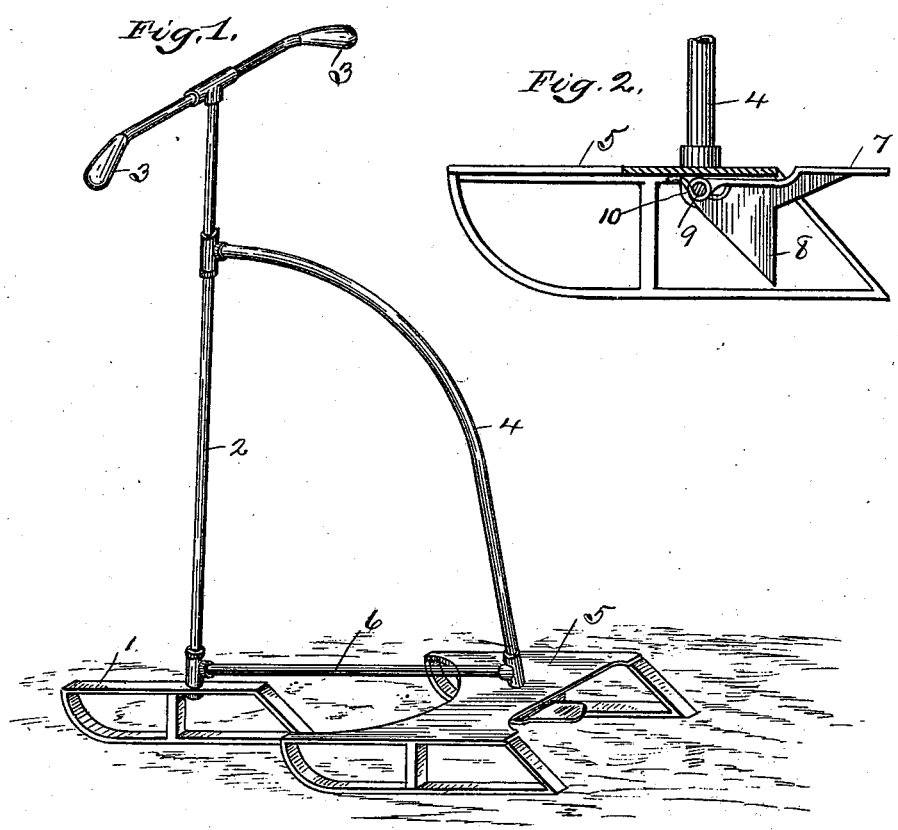
Witnesses:
M. W. Caskey
M. E. Harrison
Inventor,
George Seebick
by his Attorney,
Wm. L. Pierce.

UNITED STATES PATENT OFFICE.

GEORGE SEEBICK, OF PITTSBURG, ASSIGNOR OF ONE-HALF TO JOHN SCHEILLEIN, OF ALLEGHENY, PENNSYLVANIA.

COASTING-SLED.

SPECIFICATION forming part of Letters Patent No. 505,993, dated October 3, 1893.

Application filed September 13, 1892. Serial No. 445,788. (No model.)

*To all whom it may concern:*

Be it known that I, GEORGE SEEBICK, a citizen of the United States, residing at Pittsburg, in the county of Allegheny and State of Pennsylvania, have invented or discovered new and useful Improvements in Winter Coasters, of which the following is a specification.

In the accompanying drawings which make part of this specification, Figure 1, is a side elevation of my winter coaster; Fig. 2, a side elevation broken off and partly in section of the sled showing the brake.

The purpose of my invention generally stated, is to devise a coaster which may be used upon the snow and ice in winter, and which is propelled by a push from the foot of the rider.

My invention embodies also certain novelties of construction more fully set forth below.

In the accompanying drawings which make part of my invention, in Fig. 1, 1, is the guiding runner of the winter coaster to which is firmly secured the steering bar 2 having handles 3, 3.

4 is a backbone running from said steering bar to a sled 5, preferably made of malleable iron and in one piece.

6, is a connecting bar firmly uniting the backbone and the steering bar.

In Fig. 2 is seen the brake having a step 7 and spur 8, the whole being pivoted at 9 and normally raised by the spring 10.

The coaster stands upon the sled 5 grasping the handles 3, 3, and by a push with the foot upon the snow or ice, gives an easy and rapid movement to the machine. When he wishes to apply the brake he steps upon the step 7 which drives the spur 8 into the snow or ice with the required energy.

Having described my invention I claim—

1. The combination of a front runner; a steering bar attached thereto; a rear sled; a backbone extending from said steering bar to said rear sled and a bar connecting said steering bar and said backbone, substantially as described and shown.

2. A brake for a propeller consisting of a step pivotally connected to said propeller and provided with a spur, and a spring to retract said spur, substantially as described and shown.

In testimony whereof I have hereunto set my hand this 5th day of September, A. D. 1892.

GEORGE SEEBICK.

Witnesses:
A. D. WILKIN,
WM. L. PIERCE.